Sept. 4, 1945.  W. H. FREYGANG  2,383,961
FLUID RELEASE DEVICE
Filed Nov. 13, 1941  2 Sheets-Sheet 1

INVENTOR.
Walter H. Freygang
BY J. William Carson
ATTORNEY.

Sept. 4, 1945.  W. H. FREYGANG  2,383,961
FLUID RELEASE DEVICE
Filed Nov. 13, 1941  2 Sheets-Sheet 2

INVENTOR
Walter H. Freygang
BY
J. William Carson
ATTORNEY

Patented Sept. 4, 1945

2,383,961

UNITED STATES PATENT OFFICE 2,383,961

FLUID RELEASE DEVICE

Walter H. Freygang, Essex Fells, N. J., assignor to Specialties Development Corporation, Bloomfield, N. J., a corporation of New Jersey Application November 13, 1941, Serial No. 418,920

12 Claims. (Cl. 137—139)

The present invention relates to fluid release devices, and more particularly to a valve suitable for releasing a fluid medium under pressure, such as carbon dioxide used for fire extinguishing or other purposes.

The present invention aims to provide an improved valve or similar device having a pressure operable main fluid flow controlling member and an auxiliary or pilot member adapted to release a portion of the fluid medium for effecting actuation of the pressure operable main fluid flow controlling member. The pilot member is adapted to be actuated by an operating head attached to the valve which may be controlled manually, electrically or pneumatically, either locally or remotely. The valve and operating head may be provided with means for making the fluid flow controlling member reclosable or non-closable, as may be desired. Under certain conditions, it may be inadvisable to permit the flow controlling member to close until all of the fluid medium has been discharged, as for instance in cases where a predetermined quantity of the medium is necessary to accomplish a desired result. In other instances, after sufficient fluid medium has been supplied to accomplish a desired purpose, it may be desirable to shut off the flow of fluid medium and conserve the supply.

An object of the present invention is to provide an improved valve of the foregoing type.

Another object is to provide a valve which is compact in construction, relatively light in weight and occupies a minimum of space.

Another object is to provide a valve which comprises a minimum number of parts adapted to be readily assembled without skilled labor or special tools or machinery.

Another object is to provide a valve of the foregoing type wherein the main flow controlling member and the auxiliary or pilot member are structurally related in a novel manner, whereby the operation of the valve is improved and the operating parts are less likely to get out of adjustment or working order.

Another object is to provide a valve wherein the main and pilot members and a safety closure are structurally related in a manner which facilitates rapid assembly of the valve.

Another object is to provide a relatively simple inexpensive valve which is rugged in construction and can withstand rough usage.

A further object is to provide a valve of the foregoing character adapted to be used for releasing a pressure medium from a container or as a direction valve in a main or branch pressure medium conduit.

Other and further objects, not specifically enumerated above, will be apparent when described in greater detail in connection with the accompanying drawings, wherein.

Figure 1:
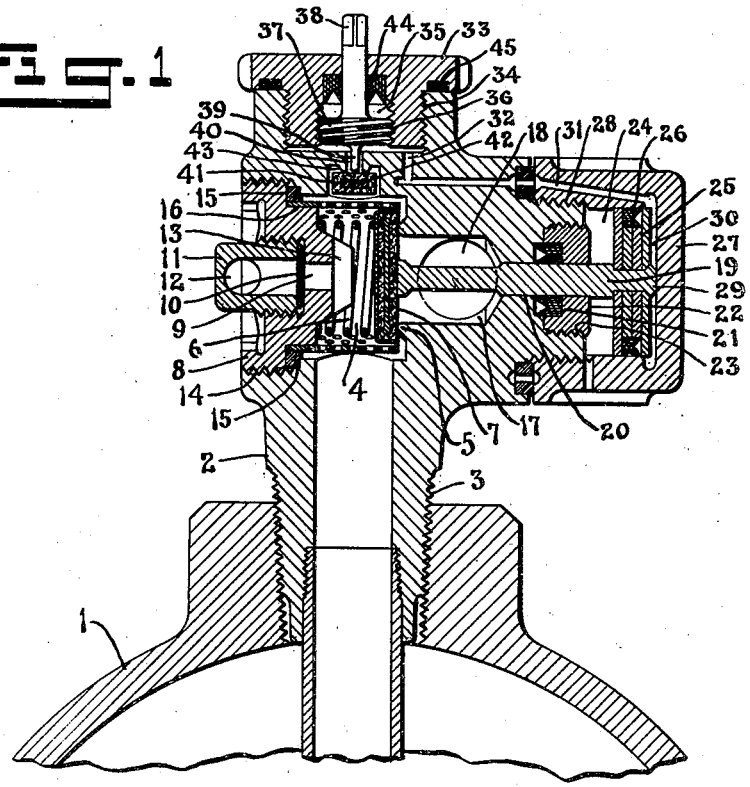
Figure 1 is a vertical sectional view of a valve or fluid medium releasing device, illustrating an embodiment of the invention.

In Figure 1, 1 is a fluid pressure container for carbon dioxide of conventional design having an outlet controlled by a release device in accordance with the present invention. This device has a valve body 2, threaded at 3 into the outlet of the container 1. The body 2 is provided with a valve chamber 4, having a valve seat 5, on which is seated by means of the pressure acting on it from within container 1, and a spring 6, a main valve 7 consisting of a metallic disc embedded in a resilient substance preferably similar to rubber, the whole backed by a metallic cup, the resilient face being turned toward the valve seat 5. The spring 6 is seated against a member 8 which forms a removable back wall for the valve chamber 4 and which has a safety release port 9 closed by a safety disc 10.

The safety disc 10 is held in place by a recoil-preventing outlet nipple 11, the latter being in accordance with Reissue Patent of the United States No. 18,839. An outlet passage 12 formed in the nipple 11 permits the harmless escape of fluid medium should the safety disc 10 break due to excessive pressure. The member 8 has a grooved extension 13 which serves to keep the port 9 clear at all times in case the valve 7 should be pressed against the back wall 8. The wall member 8 is threaded at 14 into a corresponding recess in the valve body 2, a packing 15 serving to prevent any leakage from the valve chamber 4. Mounted on the member 8 and held in place thereon by the packing 15, is a perforated cylinder 16 which permits free passage therethrough of fluid medium from the container 1 and serves as a guide for the valve 7.

The valve seat 5 separates an outlet chamber 17 which leads to an outlet port 18 from the valve chamber 4. The valve 7 is actuated by a valve stem 19 which slidably extends through the outlet chamber 17, a passage 20 in the valve body 2, past a leakage preventing gasket 21, held in place by a nipple 22 threaded into a recess 23 in the body 2, and into a piston chamber 24, where it carries a piston 25 secured thereto and movable in the chamber 24. The piston 25 carries circumferentially a leakage preventing packing ring 26. A cap 27 forms the closure of the piston chamber 24 and is secured to the body 2 by threads 28. The stem 19 has at its end a knob or button 29 which projects beyond the outward face of the piston 25 and, when in its non-actuated position, abuts against the inside end wall of the cap 27 so as to leave a space 30 adjacent to piston 25.

A passage 31 leads from the space 30 through the wall of the cap 27 through the valve body 2 to a recess or space 32. The space 32 is closed off by a closure member 33 secured therein by threads 34 and recessed at 35 to receive therein, with the aid of a quick thread 36, a control member 37 which is reciprocally movable in the recess 35 and through the quick thread 36 by means of an actuating extension 38 to which may be secured any type of actuating lever. The control member 37 has a controlling extension rod 39 which protrudes through a passage 40 into a recess 41 of the valve chamber 4, and there to unseat a pilot valve 42 which is normally held seated on a seat 43, formed in the recess 41, by the pressure of the fluid medium under confinement. A packing ring 44 around actuating member 38 prevents any leakage of the fluid medium to the outside when the pilot valve 42 has been unseated by control rod 39, as does a gasket 45 between the closure 33 and the valve body 2.

Figure 2:
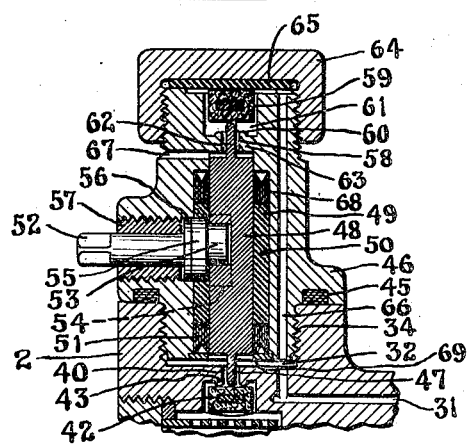
Figure 2 is a sectional view of an alternate device for controlling the pilot valve.

When reclosing of the device is desirable, the closure member 33 is replaced by the device shown in Figure 2, wherein 46 is a closure member threaded into the recess 32 of the valve body 2 by means of threads 34. The gasket 45 prevents leakage to the atmosphere as in the device of Figure 1. Here, the pilot valve 42 is controlled by an extension 47 of a controlling member 48 which is reciprocally movable in a cylindrical recess 49 formed in the closure 46 and lined by a metallic spacer cylinder 50. To make the space adjacent the extension 47 leakage tight, a gasket 51 is provided. A metallic washer 69, suitably apertured and placed underneath the packing 51 and the spacer 50, holds them stationary with respect to the movable control member 48. The control member 48 is actuated by an actuating member 52 to which, as in the case of the extension 38 on the member 37 of Figure 1, any type of actuating lever may be applied. The actuating member 52 bears on its end an eccentric type cam 53 which in coaction with a corresponding cam recess 54 in the control member 48 causes, when rotated, the member 48 to be raised or lowered as desired. The member 52 is held in position by means of a metallic collar 55, a leather washer 56, and a nipple 57 threaded into the closure member 46. On its upper end the control member 48 carries another controlling extension rod 62 which, when the member 48 is in an elevated position, unseats an exhaust valve 59 from its seat 60 formed in a recess 61 of the closure member 46. The rod 62 extends through passage 58 of a partition 63 between the cylindrical recess 49 and the recess 61.

A cap 64 tops the closure member 46, and a washer 65 therein, made of a cellulose compound known under the trade-mark "Celeron," forms the ceiling of the space underneath the cap 64, which limits the movement upward of the exhaust valve 59. A passage 66 through the closure member 46 connects the space 32 with the space underneath the washer 65, while a passage 67 exhausts the latter space to the atmosphere when the valve 59 is unseated. A second gasket 68 surrounds the upper part of the control member 48 to render the whole cylindrical recess 49 leakage proof.

In operation of the device shown in Figure 1, rotation of the actuating extension 38 will cause a rapid descent of the control member 37 through the quick threads 36 and an unseating of the pilot valve 42 by means of the extension rod 39. Fluid medium present in the valve chamber 4 under pressure will now escape through the passage 40, the space 32, and the passage 31 into the space 30 adjacent and in back of the piston 25. Here, the pressure when sufficiently great will push the piston 25 and the valve stem 19 toward the main valve 7, unseating it and thus permitting the main body of fluid medium to escape through the outlet 18. The extension 13 of the valve chamber wall 8 acts as a stop to the movement sideways of the valve 7, at the same time preventing it from jamming against the back wall of the valve chamber. When the medium has fully escaped, the spring 6 seats the main valve 7 again, any fluid in the piston chamber 30 exhausting through the main outlet 18.

In case an intermediate closing of the release device is desired before the contents of the container are entirely exhausted, the device of Figure 2 may be used. In this case, a turning of the actuating member 52, by action of the cam 53, forces the control member 48 downwards, unseating the pilot valve 42 by means of the extension 47. Fluid medium, as in the case of Figure 1, will begin escaping past the pilot valve 42 into the space 32 and simultaneously into the passage 31 toward the piston chamber 30 and into the passage 66, into the space adjacent the exhaust valve 59 where pressure thus established causes its seating on the valve seat 60. The opening of the main valve 7 and the subsequent escape of fluid medium takes place in the same manner as explained in connection with Figure 1. When reclosing is desired, rotation of the actuating member 52 in the reverse direction is all that is necessary. This will raise the control member 48, permitting pressure of the fluid medium in the valve chamber 4 to reseat the pilot valve 42, while the extension rod 62 unseats the exhaust valve 59, permitting fluid medium in the piston chamber 30 to escape to the atmosphere by way of the passages 31, 66 and 67. Pressure of fluid medium in the chamber 4 and the spring 6 combine to reseat the main valve 7.

Figure 3:
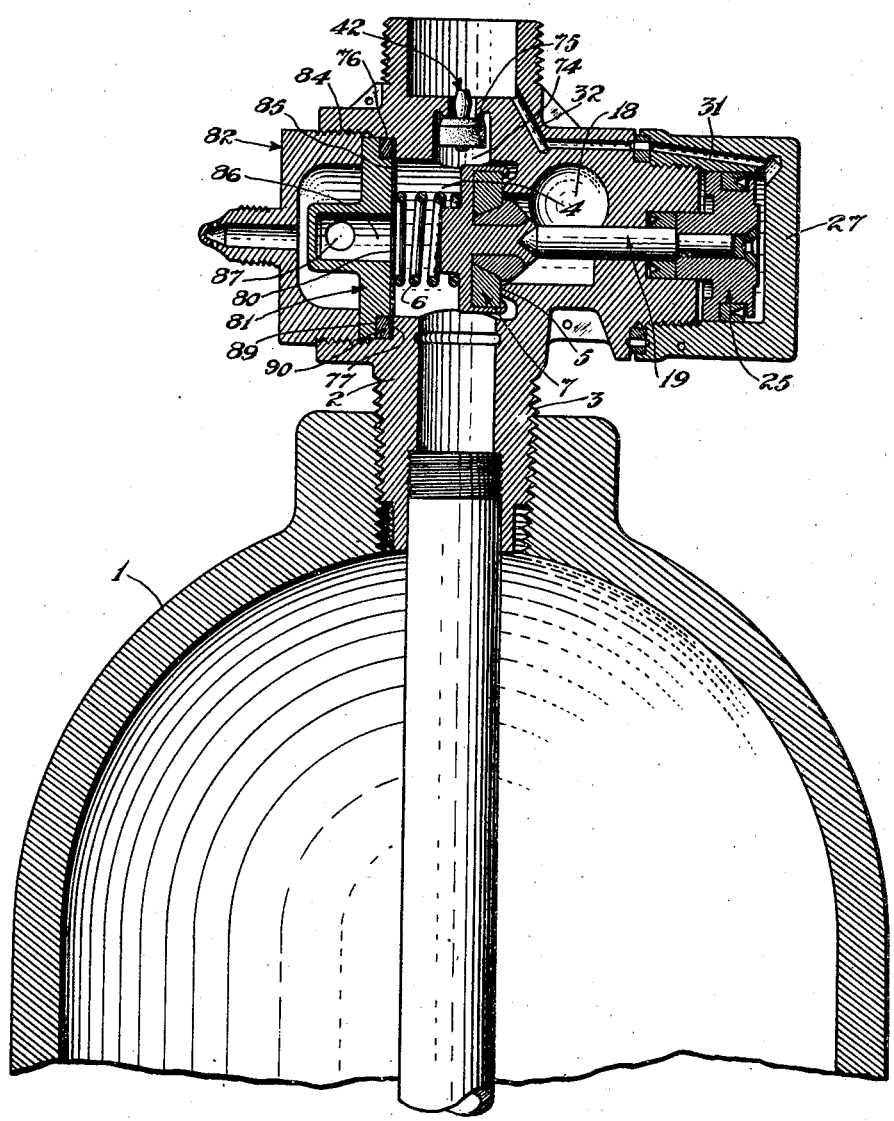
Figure 3 is a sectional view of a modified valve, illustrating another embodiment of the invention.

In Figure 3 a modified valve is illustrated, which essentially embodies the same principles of construction and operation as the valve described in connection with Figure 1. In Figure 3, the main valve 7 is of a greater thickness and extends further into the space 4. The upper side wall of the main valve 7 is substantially beneath the pilot valve 42 and substantially confines the pilot valve in the space 74 to prevent the pilot valve from accidentally falling into the space 4 and out of its operative relation with respect to its downwardly facing valve seat 75.

One end of the spring 6 engages the main valve 7 to hold it on its seat 5 and the other end of the spring is engaged to hold the spring under compression in the following described manner. The valve casing or body 2 has a bore opposite the valve seat 5 and a counterbore 76 providing an annular shoulder 77 is formed in the bore.

A safety sealing disc 80 is seated on the shoulder 77. A substantially disc-shaped or plug member 81 is fitted in the counterbore 76 and is held in place by an apertured cap member 82 threaded into the bore at 84.

The member 81 has an end face 85 adapted to contact the safety disc 80 and is provided with a bore 86 leading through a tubular extension to an outlet aperture 87 confined within the cap member 82. The member 81 further is provided with an annular circumferential groove or recess 89 providing a housing for an annular gasket or sealing ring 90, one end face of which is adapted to contact the outer peripheral portions of the safety disc 80. When the cap 82 is screwed into the bore the gasket 90 is compressed. By reason of the fact that the cooperating portions of the counterbore, the shoulder, the safety disc and the plug member completely confine the gasket, a very tight leakproof seal is provided in a convenient manner.

The end of the spring 6, opposite the end engaging the valve 7, is urged towards the plug member 81 and contacts the safety disc which is supported by the plug member.

From the foregoing description it will be seen, that the present valve is compact in construction. The valve body, in effect, is cross-shaped and has two intersecting transverse bores, one bore at one end having an inlet for the pressure medium and at its other end having a valve seat for the pilot valve. The other bore has the main valve seat therein substantially at one end and at the other end has the cap for positioning the safety disc. The intersection of the bores provides the chamber 4.

The pilot valve, the main valve, and the spring are readily positioned by inserting them through the end of the bore for receiving the cap 8 or 82. The cap serves as a closure for the space through which the spring and valves are inserted and at the same time serves as a support for the safety disc or for securing it in place. The pilot valve 42 is confined in proximity to its seat by the upper wall of the cylinder 16 (Figure 1) or by the main valve (Figure 3). The valve stem 19 and the piston 25, likewise, are readily positioned and held in assembled relation by applying the cap 27 to the threads 28. This arrangement simplifies the valve, whereby the cost and size of the valve may be greatly reduced.

While my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

The present application is a continuation-in-part of my prior application Serial Number 238,332, filed November 2, 1938.

I claim:

1. A valve of the class described comprising a valve body having a pair of transversely extending intersecting bores therein providing a valve chamber, one end of one of said bores providing an inlet for a pressure medium; a valve seat in said bore adjacent the end opposite the inlet; a valve member in said chamber adapted to abut said seat; a valve seat adjacent one end of the second bore; a second valve member in said chamber adapted to abut said second valve seat; a closure member secured in said second bore at its end opposite said second valve seat, said closure member having an end face provided with an aperture therein; a spring intermediate said second valve member and said end face having one end engaging said second valve member; and a safety disc intermediate said end face and the other end of said spring and adapted to seal the aperture in said end face; said closure member forming a support for said safety disc and said spring.

2. A valve of the class described comprising a valve body having a pair of transversely extending intersecting bores therein providing a valve chamber, one end of one of said bores providing an inlet for a pressure medium; a valve seat in said bore adjacent the end opposite the inlet; a valve member in said chamber adapted to abut said seat; a valve seat adjacent one end of the second bore; a second valve member in said chamber adapted to abut said second valve seat, said second valve member being located substantially at the intersection of said bores and being adjacent said first valve member to confine said first valve member in the end of the bore where said first valve seat is located; a closure member secured in said second bore at its end opposite said second valve seat, said closure member having an end face provided with an aperture therein; a spring intermediate said second valve member and said end face having one end engaging said second valve member; and a safety disc intermediate said end face and the other end of said spring and adapted to seal the aperture in said end face; said closure member forming a support for said safety disc and said spring.

3. A valve of the class described comprising a valve body having a pair of transversely extending intersecting bores therein providing a valve chamber, one end of one of said bores providing an inlet for a pressure medium; a valve seat in said bore adjacent the end opposite the inlet; a valve member in said chamber adapted to abut said seat; a valve seat adjacent one end of the second bore; a second valve member in said chamber adapted to abut said second valve seat; a closure member secured in said second bore at its end opposite said second valve seat; a spring having one end engaging said second valve member and having its other end urged against said closure member; and a perforated tubular shell enclosing said spring and second valve in telescoping relation, said shell having a portion of its wall adjacent said first valve member for confining said first valve member in the end of the bore where said first valve seat is located.

4. A valve of the class described comprising a valve body having a pair of transversely extending intersecting bores therein providing a valve chamber, one end of one of said bores providing an inlet for a pressure medium; a valve seat in said bore adjacent the end opposite the inlet; a valve member in said chamber adapted to abut said seat; a valve seat adjacent one end of the second bore; a second valve member in said chamber adapted to abut said second valve seat; said second bore at its end opposite said second valve seat having a counterbore providing a shoulder; a safety sealing disc having its peripheral edge seated on the shoulder; an annular gasket in said counterbore engaging the portions of said disc adjacent its periphery; a perforated plug member having an annular recess for receiving said gasket and in cooperation with said counterbore, shoulder and disc providing walls for completely confining said gasket; means secured in said second bore at its end adjacent said counterbore for urging said plug member towards said shoulder whereby said gasket is compressed and is forced against its confining walls; and a spring intermediate said disc and said second valve member; said plug member serving as a support for said safety disc and said spring.

5. A pilot valve controlled high pressure fluid medium release device comprising a valve body having an inlet and an outlet and having a valve chamber provided with a lateral wall, a main valve in said chamber for controlling said outlet, said lateral wall being formed with a recess terminating adjacent said main valve and having a valve seat, and a pilot valve freely mounted in said recess and adapted to be retained in said recess by said main valve.

6. A high pressure control valve comprising a valve body having a passage therethrough, means on said body at one end of said passage for connecting it to a source of high pressure fluid and at the other to a pilot valve operating device, said body being formed to provide a valve seat in said passage, a spring loaded valve disc in said passage normally resting on said seat by reason of said loading, means including a piston mounted in said valve body and operatively connected to said disc to unseat said disc against the reaction of its spring loading, a duct in said valve body from said passage to said piston terminating in a seat in said passage, said valve body having a recess surrounding said last seat and terminating at one end adjacent said valve disc, and a valve member freely mounted in said recess, whereby said valve member is retained when unseated in said recess by said valve disc.

7. A high pressure control valve comprising a valve body having a passage therethrough, means on said body at one end of said passage for connecting it to a source of high pressure fluid and means on said body at the other end of said passage for connecting it to a closure including a pilot valve operating device, said body being formed to provide a valve seat in said passage, a spring loaded valve disc in said passage normally resting on said seat by reason of said loading, means including a piston mounted in said valve body and operatively connected to said disc to unseat said disc against the reaction of its spring loading, a duct in said valve body from said passage to said piston terminating in a seat in said passage, said valve body having a recess surrounding said last seat and terminating at one end adjacent said valve disc, a valve member freely mounted in said recess, and means attached to said valve body disposed intermediate said valve disc and said valve member for retaining said valve member in said recess.

8. A fluid pressure operated high pressure valve comprising a valve body having a passage directly therethrough defined at its opposite ends by threaded extensions of said body, said extensions being respectively adapted for connection to a source of high fluid pressure and a closure including a valve operating device, the passage adjacent the latter end being formed with a wall having a recess provided with a valve seat, a pilot valve freely mounted in said recess cooperating with said seat, means for retaining said pilot valve in said recess, a delivery passage in said valve body intersecting said first passage and terminating in a seat thereat lying in a plane at right angles to said first seat, a spring loaded valve normally resting on said second seat, a piston chamber formed in said body, a piston in said chamber connected to the spring loaded valve, and a duct in said valve body extending from behind said piston into the extension adjacent said pilot valve.

9. A pilot valve controlled high pressure fluid medium release device comprising a valve casing having inlet and outlet passages and a valve chamber provided with a circumferential wall formed with a recess and having a valve seat within said recess, a pilot valve freely mounted in said recess for cooperation with said seat, and a main valve disposed in said chamber and in confronting relation with said recess, said main valve being operable for controlling said outlet passage and being effective to prevent the egress of said pilot valve from said recess.

10. In a pilot valve controlled high pressure fluid medium release device; a valve body having an inlet and an outlet and having a valve chamber provided with a lateral wall; a main valve in said chamber for controlling said outlet, said lateral wall being formed with a recess terminating adjacent said main valve and having a valve seat; and a pilot valve assembly including a pilot valve freely mounted within said recess and including a valve stem extending through said seat and attached to said pilot valve for effecting displacement of said pilot valve from said seat, said stem being of a sufficient length to be maintained within the seat when said pilot valve is displaced from said seat and thus preclude excessive lateral displacement of said pilot valve with respect to the seat when displaced whereby effective reseating of said pilot valve upon said seat is obtained; said main valve being effective against displacement of said assembly from said recess into said chamber whereby said pilot valve is confined in said recess at all times.

11. A high pressure fluid medium release device comprising a valve body having, in one position thereof, a vertical bore and a transverse bore intersecting the vertical bore, said transverse bore being larger in diameter than said vertical bore at the intersection of said bores to form a valve chamber, said valve chamber being formed with a valve seat encompassing said transverse bore and located to the right of the axis of said vertical bore, a spring biased valve member in said valve chamber adapted to engage said valve seat, a single valve stem mounted in a reduced section of the right hand portion of said transverse bore and adapted to unseat said valve member, a piston cylinder at the right end of said transverse bore, a piston in said cylinder adapted to actuate said valve stem, said transverse bore being provided with a fluid outlet between said valve seat and said reduced section mounting the valve stem, closure members for the ends of said transverse bore, said vertical bore being adapted to be connected at its lower end to a source of fluid medium under pressure and being formed with a valve seat encompassing a reduced valve stem receiving section near its upper end, a valve member positioned within the upper end of said vertical bore between the last named valve seat and the intersection of said vertical and transverse bores, a fluid passage connecting the vertical bore at a point above the last named valve seat to the right hand end of the transverse bore at a point between the operating side of said piston and the closure member for the right hand end of said transverse bore, and a control head for operating said last named valve member secured to said valve body adapted to form a closure for the upper end of said vertical bore to complete a fluid flow connection between the upper end of said vertical bore and said fluid passage.

12. A high pressure fluid medium release device comprising a body having, in one position thereof, vertical and horizontal intersecting bores; said vertical bore having its maximum diameter required for a given rate of discharge at its lower portion and providing an inlet for the fluid medium, and having a restricted portion adjacent its upper end forming a pilot valve recess and having a further restricted portion providing a top wall for said recess and a downwardly facing pilot valve seat on said wall in said recess, said further restricted portion providing an opening for a pilot valve operating member and providing an auxiliary outlet for fluid medium; said horizontal bore having its maximum diameter at the left end thereof and providing a valve chamber of larger diameter than said vertical bore at the intersection of said bores, and having a restricted portion at the right end of the valve chamber providing a main valve seat facing said valve chamber and defining a main outlet for the fluid medium; said horizontal bore having a further restricted portion at the right of said seat providing a bearing for a main valve operating stem; said body having a discharge conduit extending transversely from said horizontal bore between said main valve seat and said bearing; closure means at the left end of said horizontal bore providing an end wall for the main valve chamber; a main valve in said main valve chamber; a spring disposed in said main valve chamber intermediate said closure means and said main valve for urging said main valve toward its seat; a main valve operating stem extending through its bearing; a cap member secured to said valve body at the right end of said horizontal bore and cooperating with said valve body to provide a piston chamber; a piston in said piston chamber adapted to actuate said main valve operating stem; a fluid medium conducting passage extending from above said top wall to said piston chamber; a pilot valve in said pilot valve recess for controlling the flow of fluid medium to said passage; and a control head for operating said pilot valve secured to said body adapted to form a closure for the upper end of said vertical bore to complete a fluid flow connection between said passage and said auxiliary outlet.

WALTER H. FREYGANG.